(12) United States Patent
Sprague

(10) Patent No.: US 6,895,169 B1
(45) Date of Patent: May 17, 2005

(54) METHOD AND APPARATUS FOR VCR RECORDING USING KEY WORD SELECTION OF ADVANCE BROADCAST DATA

(75) Inventor: Peter J Sprague, Lenox, MA (US)

(73) Assignee: Wave Systems Corporation, New York, NY (US)

( * ) Notice: Subject to any disclaimer, the term of this patent is extended or adjusted under 35 U.S.C. 154(b) by 1826 days.

(21) Appl. No.: 08/329,345

(22) Filed: Oct. 26, 1994

(51) Int. Cl.$^7$ .............................................. H04N 5/91
(52) U.S. Cl. ........................ 386/83; 386/95; 348/461
(58) Field of Search .............................. 358/335, 341, 358/342, 343; 360/33.1, 27; 348/906, 476, 461, 5, 9, 400; 386/83, 46, 95; 455/4.1

(56) References Cited

U.S. PATENT DOCUMENTS

| | | | |
|---|---|---|---|
| 3,676,856 A | 7/1972 | Manly ..................... 340/172.5 |
| 4,310,854 A | 1/1982 | Baer ........................... 358/143 |
| 4,547,804 A | * 10/1985 | Greenberg .................. 348/461 |
| 4,706,121 A | * 11/1987 | Young ......................... 348/461 |
| 4,855,827 A | * 8/1989 | Best ........................... 348/476 |
| 4,866,770 A | 9/1989 | Seth-Smith et al. .......... 380/20 |
| 4,908,707 A | * 3/1990 | Kinghorn ................... 360/33.1 |
| 4,945,412 A | * 7/1990 | Kramer ...................... 348/460 |
| 4,949,187 A | 8/1990 | Cohen |
| 4,967,273 A | * 10/1990 | Greenberg .................. 348/461 |
| 5,010,499 A | 4/1991 | Yee ............................... 455/4 |
| 5,016,124 A | 5/1991 | Fukushima et al. ........... 360/69 |
| 5,062,147 A | 10/1991 | Pickett et al. ............... 364/900 |
| 5,121,476 A | 6/1992 | Yee ............................. 395/154 |
| 5,294,982 A | 3/1994 | Salomon et al. ............ 348/461 |
| 5,327,237 A | 7/1994 | Gerdes et al. .............. 348/476 |
| 5,390,027 A | 2/1995 | Henmi et al. |
| 5,410,360 A | * 4/1995 | Montgomery ............... 348/473 |
| 5,442,389 A | 8/1995 | Blahut et al. |
| 5,469,207 A | 11/1995 | Chambers .................... 386/83 |
| 5,526,130 A | 6/1996 | Kim ............................. 386/83 |

FOREIGN PATENT DOCUMENTS

DE        4201031        7/1993

OTHER PUBLICATIONS

English Language Abstract of German Patent No. DE 42 01 031 A1.

* cited by examiner

*Primary Examiner*—Huy Nguyen
(74) *Attorney, Agent, or Firm*—Baker Botts LLP

(57) ABSTRACT

A system method and apparatus for selectively recording on a VCR cassette, those news items of interest to a particular subscriber includes selecting video news items in accordance with previously entered user selected key word criteria. An advance data stream representing the text of each upcoming broadcast news item is provided in advance of the video broadcast of that news item. The advance data stream is searched for a match with any of the key word criteria previously entered by the subscriber. If a match between the stored user selected key word criteria and the advance data stream is found, the subscriber's VCR is enabled at the appropriate later time to record the desired news item. The VCR cassette contains those news items of interest to the particular subscriber, which the subscriber may watch at, any convenient later time.

32 Claims, 5 Drawing Sheets

US 6,895,169 B1

METHOD AND APPARATUS FOR VCR RECORDING USING KEY WORD SELECTION OF ADVANCE BROADCAST DATA

FIELD OF THE INVENTION

The present invention relates to video broadcast information systems in which selected video news items are delivered to consumers by recording each selected video news item on a VCR cassette in accordance with user selected key word criteria.

BACKGROUND OF THE INVENTION

Video news services such as satellite delivered cable television news channels provide continuous coverage of general interest news to a wide audience. Many news broadcast services, which only broadcast news, repeat important stories often, so that subscribers who have recently tuned in will not miss an important news item. Typically, a viewer tunes in and listens long enough for an update of the current events and top news stories.

Thus, receiving video news of particular interest to a specific viewer is mostly a matter of being tuned in at the right time. Except for the most important news stories, which are repeated often, the more specialized news items which are of lesser general interest are repeated less often, or not repeated at all. Also, a more timely news item may replace a less timely, but still important news item.

In order not to miss a news item of importance to a particular subscriber, it may be required to listen continuously, or at least as often as is practical. The result is that a subscriber receives a great amount of information which is not of interest, in order to receive the information which is of interest.

To focus on specific interests, specialized news channels provide continuous coverage of news events which relate to a specific category of news. For example, a specialized news channel may broadcast only stories relating to sports or finance, or the like. Still, even a specialized broadcast news service may contain a wider range of news than a particular subscriber desires. In addition, a subscriber's interests may be spread across more than one news category.

SUMMARY OF THE INVENTION

The present invention is embodied in a system method and apparatus for selectively recording on a VCR cassette, those news items of interest to a particular subscriber.

In accordance with the present invention, an advance data stream representing the text of each upcoming broadcast news item is provided in advance of the video broadcast of that news item. The subscriber enters one or more key word criteria representative of the news items of interest, i.e., representing a desired word pattern match. The user selected key word criteria is stored in a memory. The advance data stream is searched for a match with any of the key word criteria entered by the subscriber. If a match between the stored user selected key word criteria and the advance data stream is found, the subscriber's VCR is enabled at the appropriate later time to record the desired news item. Since the data stream representing the text of the video news item is provided in advance, the news item selected as a result of the key word match may be recorded in its entirety.

After a given time interval (e.g., after a day of broadcasting), the VCR cassette contains only those news items of interest to the particular subscriber, which the subscriber may watch at any convenient later time. In such manner, the subscriber will save time by not having to watch every news item. Instead, by viewing the VCR recording at a later time, the subscriber will be kept informed of those news items of specific interest to the individual subscriber.

DETAILED DESCRIPTION

Figure 2:
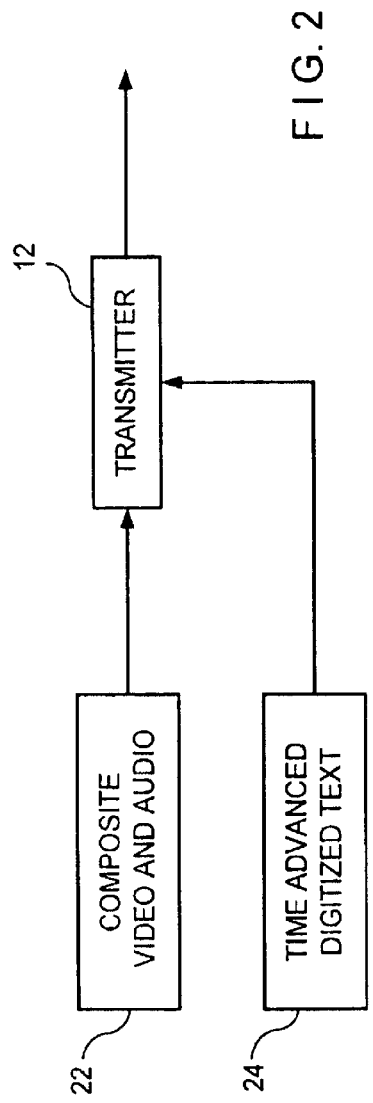
FIG. 2 is a block diagram of an encoder for encoding video signals for selectively recording video items on a VCR used in conjunction with the present invention.

A block diagram of an encoder for encoding video signals with an advance text data stream is shown in FIG. 2. First, the digitized text of each video news item is prepared in advance. Such advance text may be available from the text normally previously entered and later read by television news reporters during the broadcast. The composite video and audio signal 22 is combined with the time advanced digitized text 24 in a transmitter 26.

Figure 3:
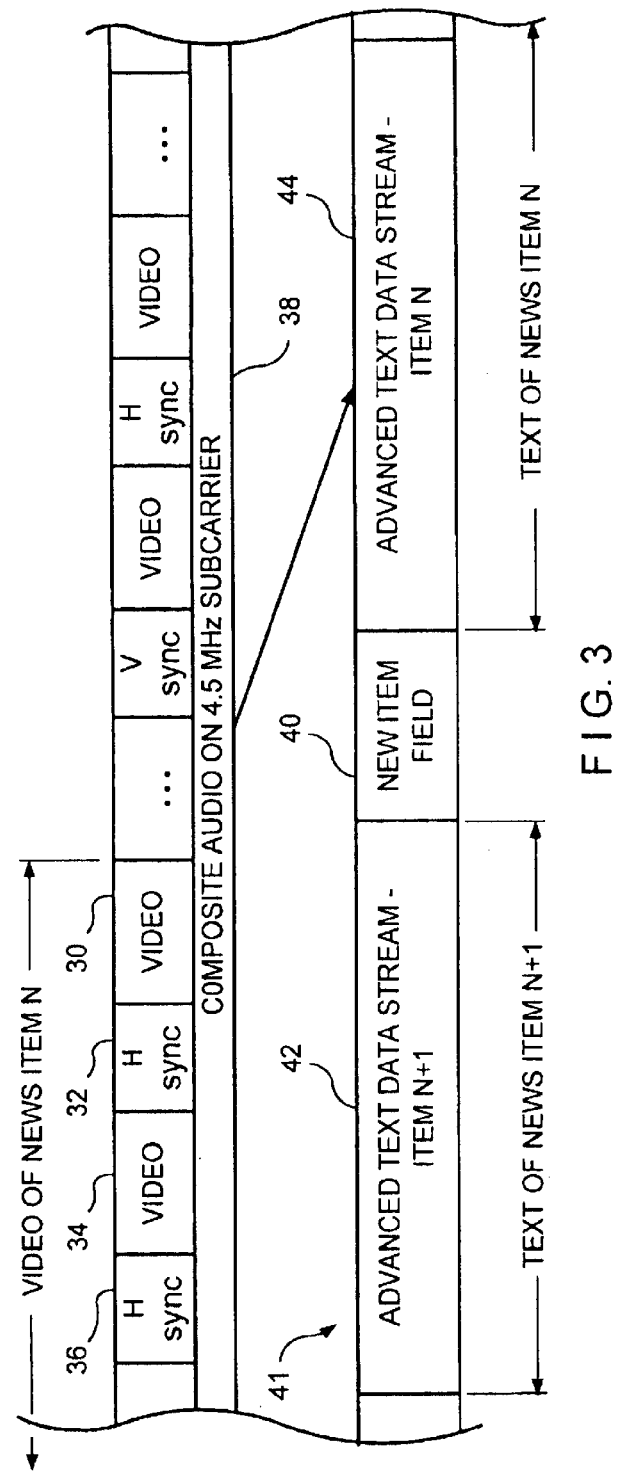
FIG. 3 is an illustration of a timing diagram of a video signal with a time advanced data stream used in conjunction with the present invention.

A timing diagram of a composite video signal with a time advanced data stream is illustrated in FIG. 3. A standard television signal consists of video lines 30, 34 separated by horizontal synchronization intervals 32, 36. The audio portion 38 of the composite video signal is carried as an FM signal modulating a 4.5 Mhz subcarrier. In accordance with the present invention, a digitized advanced text data stream 41 corresponding to the audio portion of the composite video signal, but advanced in time, is also transmitted with the composite video data stream. The composite video signal may alternatively be a compressed digital video signal.

For a portion of the video broadcast, such as news item N, the text corresponding to the audio portion of news item N is transmitted as an advanced text data stream 44. Between news items, a new item field marker 40 indicates where the text for the previous item ends, and the text for the next new item begins. For example, new item field marker 40 indicates the beginning of the text 42 of the next news item N+1, following the previous text 44 of the previous news item.

Figure 1:
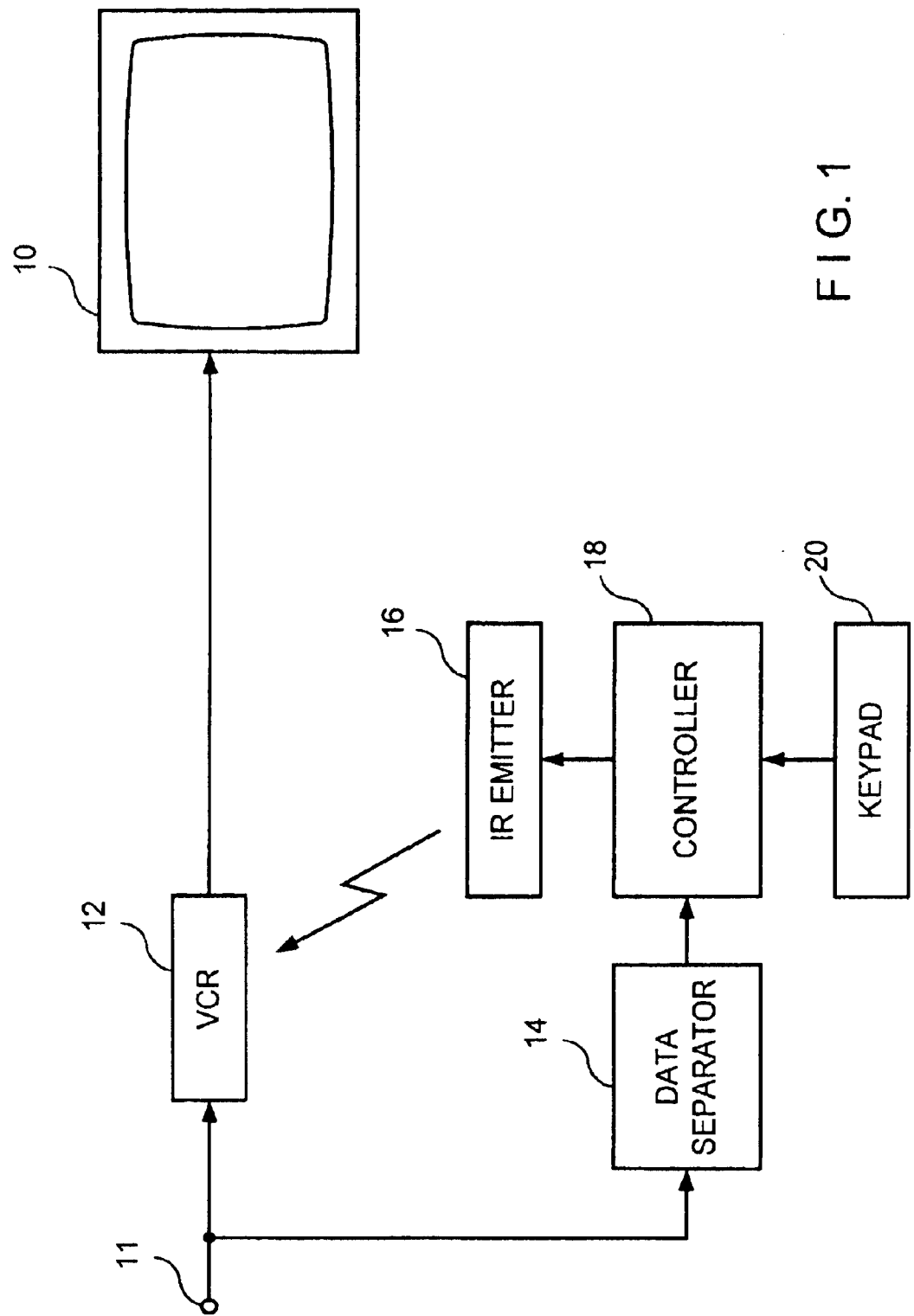
FIG. 1 is block diagram of a system for selectively recording video items on a VCR in accordance with the present invention.

As shown in FIG. 1, a television 10 receives an input signal through a VCR 12 connected to a source of video signal at terminal 11. The video signal at terminal 11 is also coupled to a data separator which separates digital data carried on the broadcast video signal and provides such separated digital data to controller 18. A keypad 20 through which the subscriber enters selected key word criteria is coupled to controller 18. Controller 18 also connected to an infrared (IR) emitter 16.

In operation, the subscriber enters key words through keypad 20 representative of the video programs of interest. The controller 18 searches the advance data stream received from data separator 14. When a match is found, controller 18 through IR emitter 16 turns VCR 12 on and off at the appropriate times to record the video program which corresponds to the match. A match may consist of an exact match between a single key word and the same word found in the advance data stream. A match may also be any of typically well known search conventions or search criteria such as a root word with wild card character, a range search or the like.

First Embodiment of the Invention

Figure 4:
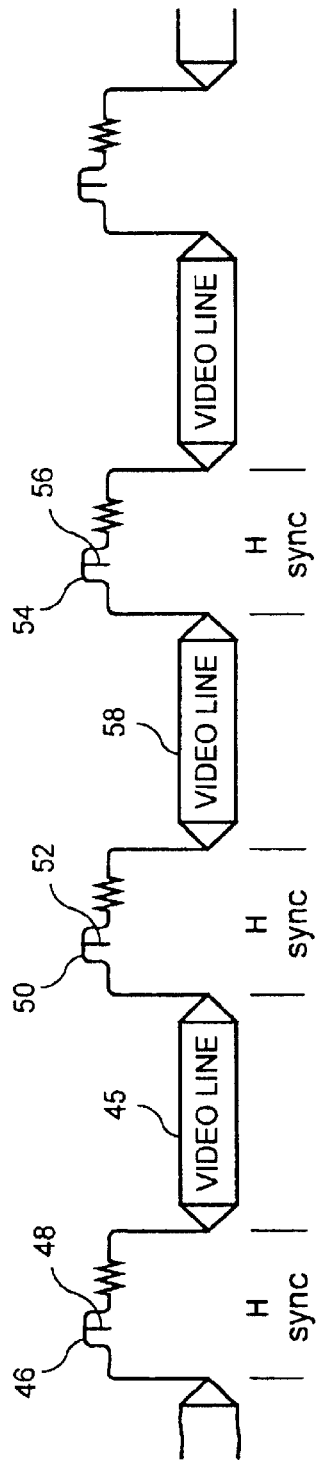
FIG. 4 is an illustration of a video signal including advanced text data signals encoded on the horizontal synchronizing pulses of a video signal used in conjunction with a first embodiment of the present invention.

A first embodiment of the invention is shown in FIG. 4. Data is encoded on the horizontal synchronizing pulses and spread throughout the video signal.

In particular, one or more data bits 48, 52 and 56 are encoded on respective horizontal synchronizing pulses 46, 50 and 54 separating the video lines 45, 58. The data bits 48, 52 and 56 represent advanced text data spaced throughout the video signal and transmitted in delayed real time synchronism with the audio portion of the video signal.

Figure 6:
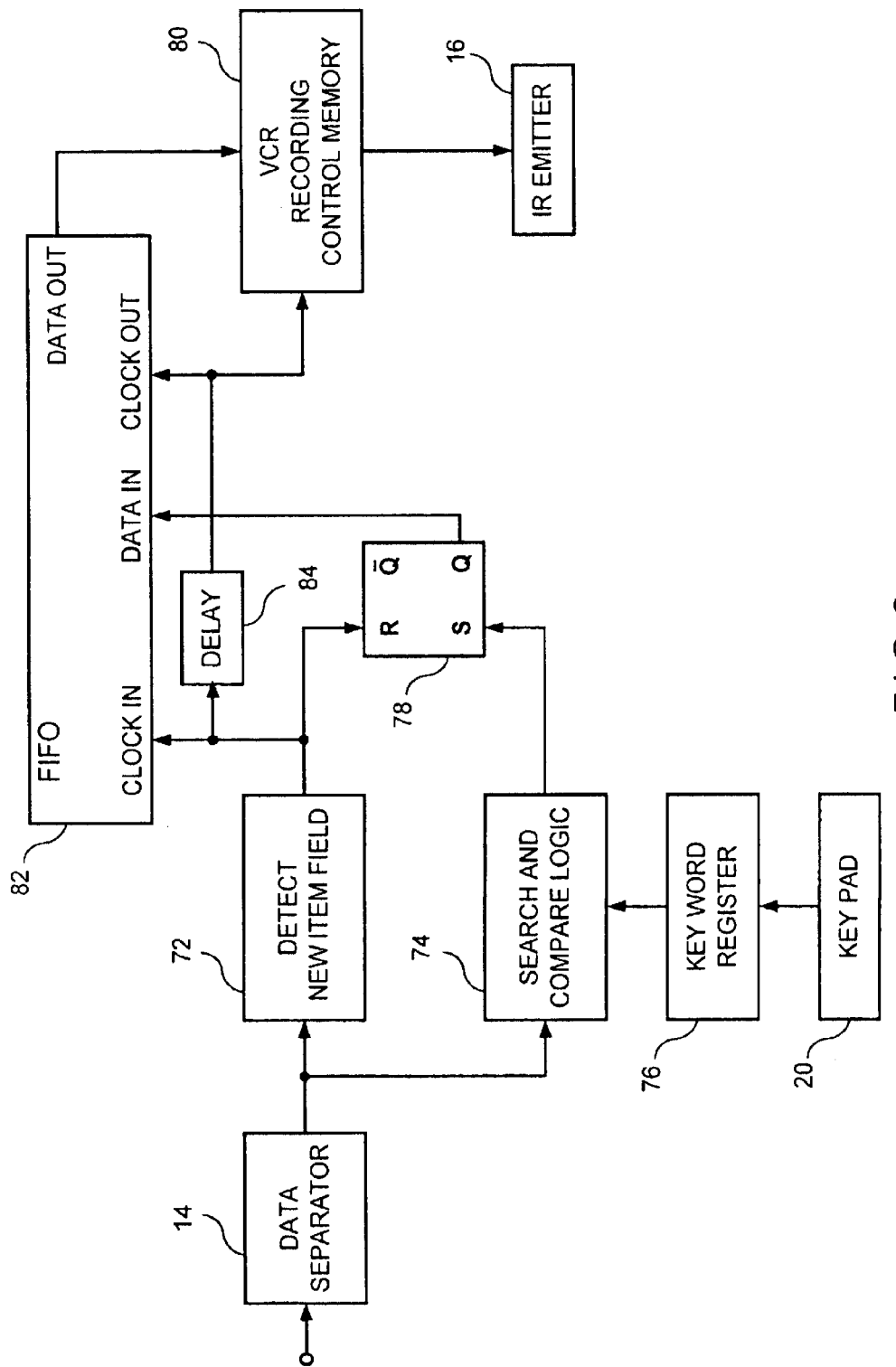
FIG. 6 is a block diagram of a first embodiment of a VCR system controller in accordance with the present invention.

A block diagram of a VCR system controller, in accordance with the first embodiment of the video signal, is shown in FIG. 6. The advanced text data is stripped from the video signal by separator 14. The received text is coupled to a detector 72, which detects the occurrence of a new item field marker. The received text is also coupled to the search and compare logic 74. A keypad 20 is coupled to a key word register 76 (a memory for storage of one or more key words or key word search criteria), the output of which is coupled to the search and compare logic 74. The reset input of flip-flop 78 is coupled to the output of the new item field marker detector 72, which also serves as the input clock (input data strobe) to a first in, first out (FIFO) memory buffer. The set input of flip-flop 78 is coupled to the output of the search and compare logic 74. A delay 84 provides a delayed signal corresponding to the output of the new item field detector 72 to provide a delayed version of that signal which serves as the output clock (output data strobe) of FIFO 82. The data output of FIFO 82 is coupled to a VCR recording control memory 80, the output of which is coupled to IR emitter 16.

During operation, flip-flop 78 indicates the decision as to whether the later broadcast video news item corresponding to the advance text being received contains a key word match and is therefore to be recorded by the VCR 12 (in FIG. 1). A reset condition of flip-plop 78 at the end of the advanced text reception, indicates that the news item is not to be recorded. A set condition of flip-flop 78 at the end of the advanced text reception, indicates that the news item is to be recorded.

In operation, at the beginning of the advanced text of a news item, the detection of the new item field by detector 72, stores the current contents of flip-flop 78 in FIFO 82, and resets flip-flop 78. If at any time during the advanced text of the news item, the search and compare logic 74 detects a match between the contents of the key word register 76 and the data stream from data separator 14, then flip-flop 78 will be set. Thus, when the next new item field marker is received, the clock in to FIFO 82 causes the contents of flip-flop 78 to be recorded in FIFO 82.

The video of the news item is delayed by a fixed amount measured from its corresponding new item field marker. The fixed delay is substantially equal to the delay provided by clock delay 84. At such fixed time delay later, the output of delay 84 to the clock in signal of FIFO 82 causes FIFO 82 to output the previously stored value of flip-flop 78 to VCR recording control memory 80. It is noted that in yet another embodiment, where the maximum length of any news item is known in advance, a predetermined delay from the occurrence of a key word match may be used to record a portion of the video signal in some fixed time interval before and after the occurrence of the key word match. In the latter case the new item field separators may be eliminated.

The VCR recording control memory 80 contains the control codes necessary to drive the IR emitter 16 which turns on and turns off VCR 12 at the appropriate time. That is, responsive to the stored bits in FIFO 82, the VCR recording control memory 80 causes the VCR to record the video news items selected as a result of matches between the advanced text received from data separator 14 and the contents of key word register 76.

Second Embodiment of the Invention

Figure 5:
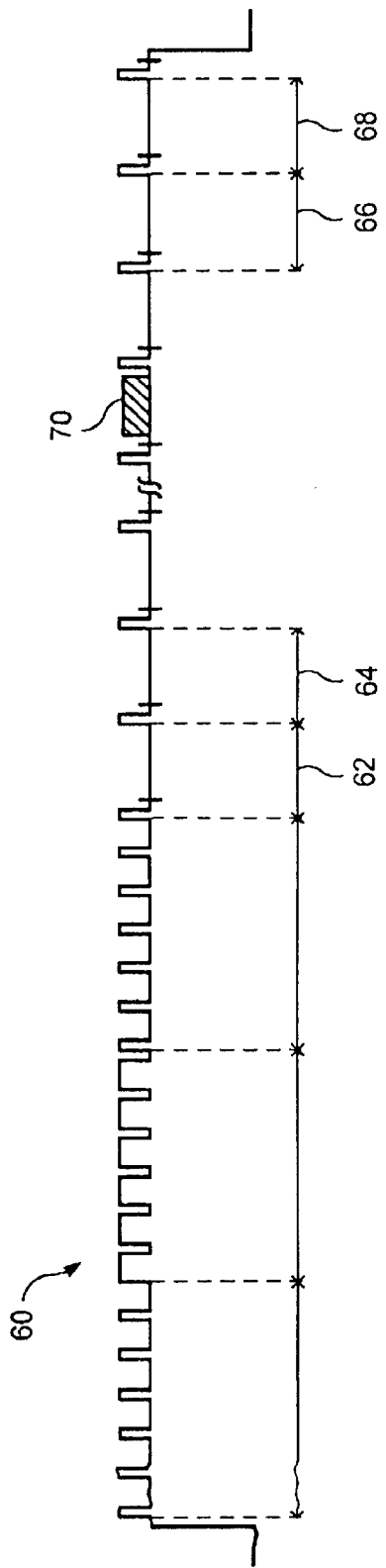
FIG. 5 is an illustration of a video signal including advanced text data signals encoded on the vertical synchronizing interval of a video signal used in conjunction with a second embodiment of the present invention.

In a second embodiment of the present invention, shown in FIG. 5, time advanced data is encoded in more concentrated form on one line of each vertical blanking interval, or for consecutive vertical blanking intervals, just before the beginning of each news item to which such data relates. In particular, a burst of data is encoded in the vertical interval 60, as a group of data bits 70 on an unused video line in the vertical blanking interval. In yet other alternative embodiments, data may be carried in other portions of the video signal. For example, data may also be carried on one or more unused video lines 62, 64, 66, 68 of the vertical blanking interval, modulated on an in-band subcarrier signal or on an out of band carrier signal transmitted simultaneously, but not within the spectrum occupied by the video signal.

Figure 7:
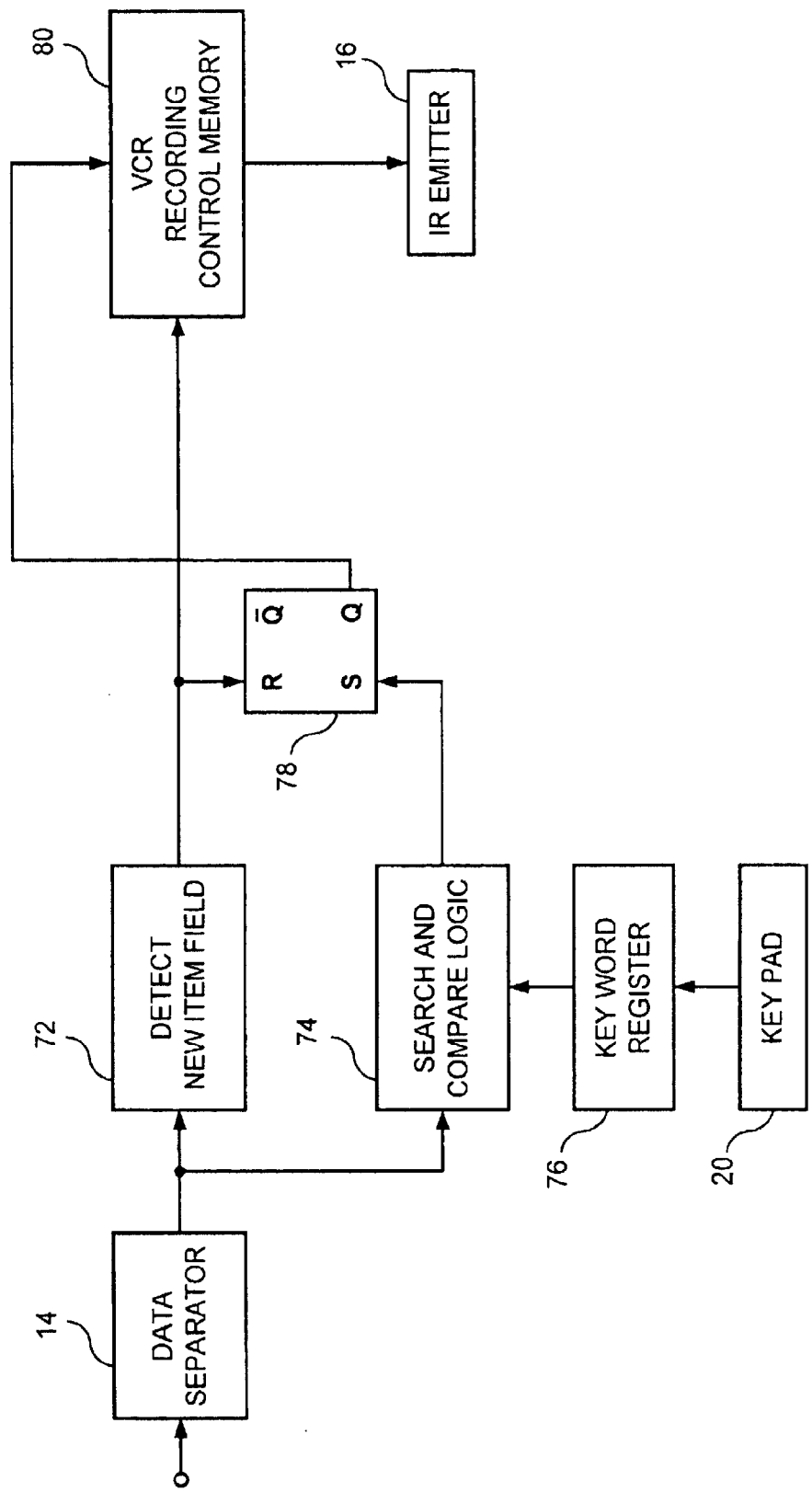
FIG. 7 is a block diagram of a second embodiment of VCR system controller in accordance with the present invention.

FIG. 7 illustrates a block diagram of a VCR system controller in accordance with the second embodiment of the present invention. Since the data is concentrated as a burst of data occurring just before the video news item to which it relates, the text of the received news item can be searched just before the video news item is received. The decision to record or not to record the broadcast video news item is made just before the news item begins. The VCR is set to record mode, and on left on pause. In recording pause mode, the VCR can begin recording relative quickly. An important advantage of the second embodiment is that it simplifies the VCR system controller. In particular, the FIFO 82 memory and delay 84 of FIG. 6 are not necessary, and are eliminated. Instead of a delay 84, the Q output of flip-flop 78 is coupled to VCR recording control memory 80 without substantial delay.

In operation, a new field marker is detected 72 which sets flip-flop 78. The data following the new field marker is searched by search and compare logic 74 to detect a match, if any, between the received data and the contents of key word register 76. If no match is detected, the VCR recording control memory outputs a control signal to stop any VCR recording. If a match is detected, the VCR recording control memory outputs a control signal to start the VCR recording. In such manner, news items which contain text matching the key word register contents will be recorded on the VCR cassette.

What is claimed is:

1. In a television transmitter, a method comprising:

generating a composite video signal, including a video signal and an audio signal, wherein said audio signal corresponds to the audio portion of said composite video signal, said composite video signal containing a plurality of news items, a given news item of said plurality of news items being defined by a respective beginning and ending of said given news item;

generating a time advanced text data stream in digital form substantially corresponding to the spoken words of said audio portion of said composite video signal, said time advanced text data stream being advanced in time so that substantially all of said time advanced text data stream in digital form corresponding to said given news item is generated before the beginning of said given news item; and combining said generated composite video signal and said time advanced text data stream.

2. A method in accordance with claim 1, wherein said time advanced text data stream in digital form is combined in the horizontal synchronizing interval of said composite video signal.

3. A method in accordance with claim 1, wherein said time advanced text data stream in digital form is combined in the vertical blanking interval of said composite video signal.

4. A method in accordance with claim 1, wherein said time advanced text data stream in digital form is modulated onto a subcarrier and combined with said composite video signal.

5. A method in accordance with claim 1, wherein said time advanced text data stream in digital form is modulated onto an out of band carrier and transmitted simultaneously with said composite video signal.

6. A method in accordance with claim 1, wherein said composite video signal includes a plurality of news items and said time advanced text data stream in digital form corresponding to said audio portion of said composite video signal, further includes at least one new item field marker separating said plurality of news items.

7. In a system including a transmitter for generating a composite video signal including an audio signal, said audio signal corresponding to the audio portion of said composite video signal, said composite video signal containing a plurality of news items including a given news item of interest to a subscriber, means for generating a time advanced text data stream in digital form corresponding to said audio portion of said composite video signal, said time advanced text data stream being advanced in time so that substantially all of said time advanced text data stream in digital form corresponding to said given news item is generated before the beginning of said given news item, means for combining said time advanced text data stream in digital form with said composite video signal, a method for controlling a VCR responsive to a key word selected by a subscriber, said method comprising:

receiving said composite video signal including said plurality of new items;

storing a key word selected by said subscriber, to form a stored key word representing a desired word pattern of interest to said subscriber when said word pattern is spoken in said audio portion of said given news item;

receiving said time advanced text data stream in digital form before the beginning of said given news item; and controlling said VCR responsive to said stored key word selected by said subscriber to record portions of said composite video signal of interest to said subscriber corresponding to said given news item including said word pattern spoken in said audio portion of said composite video signal.

8. A method in accordance with claim 7, wherein said step of controlling said VCR responsive to said stored key word selected by said subscriber to record portions of said composite video signal of interest to said subscriber further comprises:

separating said time advanced text data stream in digital form from said composite video signal;

comparing said key word to said time advanced text data stream in digital form to find a match between said key word and said time advanced text data stream; and controlling said VCR to record said composite video signal responsive to said match between said key word and said time advanced text data stream.

9. A method in accordance with claim 8, wherein said composite video signal further includes a plurality of news items, and wherein said time advanced text data stream in digital form further includes at least one new item field marker separating said plurality of news items, said method further comprising:

receiving said new item field marker separating said plurality of news items; and turning on said VCR responsive to said match between said key word and said time advanced text data stream in digital form, and to said step of receiving said new item field marker.

10. A method in accordance with claim 9, where said time advanced text data stream in digital form is transmitted in delayed real time synchronism with said audio portion of said composite video signal, and said step of turning on said VCR responsive to said match between said key word and said digital data, and to said new item field marker includes turning on said VCR responsive to the first new item field marker following from said match.

11. A method in accordance with claim 8, where said time advanced text data stream in digital form is transmitted as a burst of data occurring just before the audio portion of said composite video signal to which it relates, and said step of turning on said VCR responsive to said match between said key word and said time advanced text data stream in digital form, includes turning on said VCR responsive to said match.

12. In a system method for controlling a VCR including, at a television transmitter, a method comprising:

generating a composite video signal, including a video signal and an audio signal, wherein said audio signal corresponds to the audio portion of said composite video signal, said composite video signal containing a plurality of news items, a given news item of said plurality of news items being defined by a respective beginning and ending of said given news item;

generating a time advanced text data stream in digital form substantially corresponding to the spoken words of said audio portion of said composite video signal, said time advanced text data stream being advanced in time so that substantially all of said time advanced text data stream in digital form corresponding to said given news item is generated before the beginning of said given news item; and combining said generated composite video signal and said time advanced text data stream; and at a television receiver, a method for controlling a VCR responsive to a key word selected by a subscriber, said method comprising:

receiving said composite video signal including said plurality of new items;

storing a key word selected by said subscriber, to form a stored key word representing a desired word pattern of interest to said subscriber when said word pattern is spoken in said audio portion of said given news item;

receiving said time advanced text data stream in digital form before the beginning of said given news item; and controlling said VCR responsive to said stored key word selected by said subscriber to record portions of said composite video signal of interest to said subscriber corresponding to said given news item including said word pattern spoken in said audio portion of said composite video signal.

13. A method in accordance with claim 12, wherein said step of controlling said VCR responsive to said stored key word selected by said subscriber to record portions of said composite video signal of interest to said subscriber, further comprises:

separating said time advanced text data stream in digital form from said composite video signal;

comparing said key word to said time advanced text data stream in digital form to find a match between said key word and said time advanced text data stream; and controlling said VCR to record said composite video signal responsive to said match between said key word and said time advanced text data stream.

14. A method in accordance with claim 13, wherein said composite video signal further includes a plurality of news items, and wherein said time advanced text data stream in digital form further includes at least one new item field marker separating said plurality of news items, said method further comprising:

receiving said new item field marker separating said plurality of news items; and turning on said VCR responsive to said match between said key word and said time advanced text data stream in digital form, and to said step of receiving said new item field marker.

15. A method in accordance with claim 14, where said time advanced text data stream in digital form is transmitted in delayed real time synchronism with said audio portion of said composite video signal, and said step of turning on said VCR responsive to said match between said key word and said digital data, and to said new item field marker includes turning on said VCR responsive to the first new item field marker following from said match.

16. A method in accordance with claim 13, where said time advanced text data stream in digital form is transmitted as a burst of data occurring just before the audio portion of the video signal to which it relates, and said step of turning on said VCR responsive to said match between said key word and said time advanced text data stream in digital form, includes turning on said VCR responsive to said match.

17. In a television transmitter, an apparatus comprising:

means for generating a composite video signal, including a video signal and an audio signal, wherein said audio signal corresponds to the audio portion of said composite video signal, said composite video signal containing a plurality of news items, a given news item of said plurality of news items being defined by a respective beginning and ending of said given news item;

means for generating a time advanced text data stream in digital form substantially corresponding to the spoken words of said audio portion of said composite video signal, said time advanced text data stream being advanced in time so that substantially all of said time advanced text data stream in digital form corresponding to said given news item is generated before the beginning of said given news item; and means for combining said generated composite video signal and said time advanced text data stream.

18. An apparatus in accordance with claim 17, wherein said time advanced text data stream in digital form is combined in the horizontal synchronizing interval of said composite video signal.

19. An apparatus in accordance with claim 17, wherein said time advanced text data stream in digital form is combined in the vertical blanking interval of said composite video signal.

20. An apparatus in accordance with claim 17, wherein said time advanced text data stream in digital form is modulated onto a subcarrier and combined with said composite video signal.

21. An apparatus in accordance with claim 17, wherein said time advanced text data stream in digital form is modulated onto an out of band carrier and transmitted simultaneously with said composite video signal.

22. An apparatus in accordance with claim 17, wherein said composite video signal includes a plurality of news items and said time advanced text data stream in digital form corresponding to said audio portion of said composite video signal, further includes at least one new item field marker separating said plurality of news items.

23. In a system including a transmitter for generating a composite video signal including an audio signal, said audio signal corresponding to the audio portion of said composite video signal, said composite video signal containing a plurality of news items including a given news item of interest to a subscriber, means for generating a time advanced text data stream in digital form corresponding to said audio portion of said composite video signal, said time advanced text data stream being advanced in time so that substantially all of said time advanced text data stream in digital form corresponding to said given news item is generated before the beginning of said given news item, means for combining said time advanced text data stream in digital form with said composite video signal, an apparatus for controlling a VCR responsive to a key word selected by a subscriber, said apparatus comprising:

means for receiving said composite video signal including said plurality of new items;

means for storing a key word selected by said subscriber, to form a stored key word representing a desired word pattern of interest to said subscriber when said word pattern is spoken in said audio portion of said given news item;

means for receiving said time advanced text data stream in digital form before the beginning of said given news item; and means for controlling said VCR responsive to said stored key word selected by said subscriber to record portions of said composite video signal of interest to said subscriber corresponding to said given news item including said word pattern spoken in said audio portion of said composite video signal.

24. An apparatus in accordance with claim 23, wherein said means for controlling said VCR responsive to said stored key word selected by said subscriber to record portions of said composite video signal of interest to said subscriber further comprises:

means for separating said time advanced text data stream in digital form from said composite video signal;

means for comparing said key word to said time advanced text data stream in digital form to find a match between said key word and said time advanced text data stream; and means for controlling said VCR to record said composite video signal responsive to said match between said key word and said time advanced text data stream.

25. An apparatus in accordance with claim 24, wherein said composite video signal further includes a plurality of news items, and wherein said time advanced text data stream in digital form further includes at least one new item field marker separating said plurality of news items, said apparatus further comprising:

means for receiving said new item field marker separating said plurality of news items; and means for turning on said VCR responsive to said match between said key word and said time advanced text data stream in digital form, and to said means for receiving said new item field marker.

26. An apparatus in accordance with claim 25, where said time advanced text data stream in digital form is transmitted in delayed real time synchronism with said audio portion of said composite video signal, and said means for turning on said VCR responsive to said match between said key word and said digital data, and to said new item field marker includes turning on said VCR responsive to the first new item field marker following from said match.

27. An apparatus in accordance with claim 24, where said time advanced text data stream in digital form is transmitted as a burst of data occurring just before the audio portion of said composite video signal to which it relates, and said means for turning on said VCR responsive to said match between said key word and said time advanced text data stream in digital form, includes turning on said VCR responsive to said match.

28. In a system apparatus for controlling a VCR including, at a television transmitter, an apparatus comprising:

means for generating a composite video signal, including a video signal and an audio signal, wherein said audio signal corresponds to the audio portion of said composite video signal, said composite video signal containing a plurality of news items, a given news item of said plurality of news items being defined by a respective beginning and ending of said given news item;

means for generating a time advanced text data stream in digital form substantially corresponding to the spoken words of said audio portion of said composite video signal, said time advanced text data stream being advanced in time so that substantially all of said time advanced text data stream in digital form corresponding to said given news item is generated before the beginning of said given news item; and means for combining said generated composite video signal and said time advanced text data stream; and at a television receiver, an apparatus for controlling a VCR responsive to a key word selected by a subscriber, said apparatus comprising:

means for receiving said composite video signal including said plurality of new items;

means for storing a key word selected by said subscriber, to form a stored key word representing a desired word pattern of interest to said subscriber when said word pattern is spoken in said audio portion of said given news item;

means for receiving said time advanced text data stream in digital form before the beginning of said given news item; and means for controlling said VCR responsive to said stored key word selected by said subscriber to record portions of said composite video signal of interest to said subscriber corresponding to said given news item including said word pattern spoken in said audio portion of said composite video signal.

29. An apparatus in accordance with claim 28, wherein said means for controlling said VCR responsive to said stored key word selected by said subscriber to record portions of said composite video signal of interest to said subscriber, further comprises:

means for separating said time advanced text data stream in digital form from said composite video signal;

means for comparing said key word to said time advanced text data stream in digital form to find a match between said key word and said time advanced text data stream; and means for controlling said VCR to record said composite video signal responsive to said match between said key word and said time advanced text data stream.

30. An apparatus in accordance with claim 29, wherein said composite video signal further includes a plurality of news items, and wherein said time advanced text data stream in digital form further includes at least one new item field marker separating said plurality of news items, said apparatus further comprising:

means for receiving said new item field marker separating said plurality of news items; and means for turning on said VCR responsive to said match between said key word and said time advanced text data stream in digital form, and to said means for receiving said new item field marker.

31. An apparatus in accordance with claim 30, where said time advanced text data stream in digital form is transmitted in delayed real time synchronism with said audio portion of said composite video signal, and said means for turning on said VCR responsive to said match between said key word and said digital data, and to said new item field marker includes turning on said VCR responsive to the first new item field marker following from said match.

32. An apparatus in accordance with claim 29, where said time advanced text data stream in digital form is transmitted as a burst of data occurring just before the audio portion of the video signal to which it relates, and said means for turning on said VCR responsive to said match between said key word and said time advanced text data stream in digital form, includes turning on said VCR responsive to said match.

* * * * *